United States Patent
Ota et al.

(10) Patent No.: US 10,073,762 B2
(45) Date of Patent: Sep. 11, 2018

(54) DEBUG DEVICE, DEBUG METHOD, AND DEBUG PROGRAM

(71) Applicant: NTT DOCOMO, INC., Chiyoda-ku (JP)

(72) Inventors: Tomohiro Ota, Chiyoda-ku (JP); Sadaatsu Kato, Chiyoda-ku (JP); Takeshi Kamiyama, Chiyoda-ku (JP); Takayuki Nakanishi, Chiyoda-ku (JP); Koichi Asano, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 185 days.

(21) Appl. No.: 14/916,636

(22) PCT Filed: Aug. 15, 2014

(86) PCT No.: PCT/JP2014/071492
§ 371 (c)(1),
(2) Date: May 10, 2016

(87) PCT Pub. No.: WO2015/033759
PCT Pub. Date: Mar. 12, 2015

(65) Prior Publication Data
US 2016/0217059 A1    Jul. 28, 2016

(30) Foreign Application Priority Data
Sep. 4, 2013  (JP) ................................ 2013-183152

(51) Int. Cl.
*G06F 9/44*    (2018.01)
*G06F 9/45*    (2006.01)
(Continued)

(52) U.S. Cl.
CPC ............ *G06F 11/3664* (2013.01); *G06F 1/26* (2013.01); *G06F 11/30* (2013.01); *G06F 11/3612* (2013.01); *G06F 11/3648* (2013.01)

(58) Field of Classification Search
CPC .. G06F 11/3612–11/3696; G06F 11/30; G06F 1/26
See application file for complete search history.

(56) References Cited

U.S. PATENT DOCUMENTS 7,149,636 B2 *  12/2006  Cyran ................. G06F 11/3024
                                                702/60
7,434,205 B1 *  10/2008  Steenhagen ............... G06F 8/20
                                                717/124
(Continued)

FOREIGN PATENT DOCUMENTS

JP      2009-75965 A      4/2009
WO   WO 2006/024325 A1   3/2006

OTHER PUBLICATIONS

Shiao-Li Tsao, PowerMemo: A Power Profiling Tool for Mobile Devices in an Emulated Wireless Environment, 2012, pp. 1-5. https://ieeexplore.ieee.org/stamp/stamp.jsp?tp=&arnumber=6376367 (Year: 2012).*
(Continued)

*Primary Examiner* — Mongbao Nguyen
(74) *Attorney, Agent, or Firm* — Oblon, McClelland, Maier & Neustadt, L.L.P.

(57) ABSTRACT

A debug device to more accurately compute current consumption or a current consumption quantity from a computer program to be executed in a mobile terminal when a computer program is debugged. The mobile terminal includes a terminal log information acquisition unit configured to acquire terminal log information indicating an operating state of hardware constituting the mobile terminal during debug execution and a current consumption compu-
(Continued)

tation unit configured to compute the current consumption or the current consumption quantity of the mobile terminal during debug execution on the basis of the terminal log information and computation information for computing the unique current consumption or the unique current consumption quantity from the operating state of the hardware which is pre-stored.

7 Claims, 12 Drawing Sheets

(51) Int. Cl.
  *G06F 11/36* (2006.01)
  *G06F 11/30* (2006.01)
  *G06F 1/26* (2006.01)

(56) References Cited

U.S. PATENT DOCUMENTS

| | | | | |
|---|---|---|---|---|
| 7,496,903 | B2* | 2/2009 | Rees | G06F 11/3612 717/124 |
| 7,739,664 | B2* | 6/2010 | Bates | G06F 11/3664 717/127 |
| 7,788,730 | B2* | 8/2010 | Dean | G06F 21/54 713/156 |
| 8,079,014 | B2* | 12/2011 | Watanabe | G06F 11/3664 717/100 |
| 8,166,459 | B2* | 4/2012 | Suenbuel | G06F 11/366 714/25 |
| 8,522,209 | B2* | 8/2013 | Wintergerst | G06F 11/3466 717/124 |
| 8,645,761 | B2* | 2/2014 | Barman | G06F 11/3604 714/38.1 |
| 8,930,917 | B2* | 1/2015 | Mittal | G06F 11/366 717/124 |
| 9,020,463 | B2* | 4/2015 | Kandregula | G06F 11/3013 455/405 |
| 9,146,832 | B2* | 9/2015 | Degenhardt | G06F 11/3632 |
| 2003/0191976 | A1 | 10/2003 | Cyran et al. | |
| 2008/0010493 | A1* | 1/2008 | Watanabe | G06F 11/3664 714/4.1 |
| 2010/0083244 | A1* | 4/2010 | Bothwell | G06F 8/61 717/174 |
| 2011/0258613 | A1* | 10/2011 | Bhogal | G06F 11/3636 717/129 |
| 2013/0152056 | A1* | 6/2013 | Chang | G06F 11/0742 717/131 |
| 2013/0174128 | A1 | 7/2013 | Kansal et al. | |
| 2013/0247007 | A1* | 9/2013 | Fuhrer | G06F 11/362 717/129 |
| 2014/0033183 | A1* | 1/2014 | Brown | G06F 11/3636 717/131 |
| 2015/0089304 | A1* | 3/2015 | Jeong | G06F 21/31 714/48 |

OTHER PUBLICATIONS

Shih-Hao Hung, Performance and Power Estimation for Mobile-Cloud Applications on Virtualized Platforms, 2013, pp. 1-8. https://ieeexplore.ieee.org/stamp/stamp.jsp?tp=&arnumber=6376367 (Year: 2013).*
Fernandao Henrique Silva Fragoso, Offload debugging for Java programmed embedded systems, 2013, pp. 1-4. https://ieeexplore.ieee.org/stamp/stamp.jsp?tp=&arnumber=6825334 (Year: 2013).*
Luis Corral, A Method for Characterizing Energy Consumption in Android Smartphones, 2013, pp. 38-45. https://ieeexplore.ieee.org/stamp/stamp.jsp?tp=&arnumber=6606420 (Year: 2013).*
Extended European Search Report dated Jul. 6, 2016 in Patent Application No. 14842850.1.
Combined Office Action and Search Report dated May 27, 2017 in Chinese Patent Application No. 201480047777.1 (with English translation).
International Search Report dated Nov. 18, 2014 in PCT/JP2014/071492 filed Aug. 15, 2014.
English translation of the International Preliminary Report on Patentability and Written Opinion dated Mar. 17, 2016 in PCT/JP2014/071492.
Office Action dated Dec. 7, 2017 in Chinese Patent Application No. 201480047777.1 (with English language translation).

* cited by examiner

Fig.5

| Hardware name | Operating state name | Operating state value |
|---|---|---|
| CPU | Operation frequency | 0.5GHz |
| | Operation rate | 10[%] |
| GPU | Operation frequency | 0.5GHz |
| | Operation rate | 10[%] |
| Display | Luminance (255 gray scales) | 127 |
| 3G/LTE | Communication type | LTE |
| | Throughput | 0.1[Mbps] |
| WiFi | Throughput | 0[Mbps] |
| Bluetooth | Throughput | 0.1[Mbps] |
| File (Read/Write) | Throughput | 0.1[Mbps] |
| GPS | State | ON |
| Speaker | Volume | 100[%] |
| Sensor (acceleration) | State | ON |
| Sensor (geomagnetic) | State | ON |
| Sensor (gyro) | State | ON |

Fig.6

| Hardware name | Operating state | | Current consumption |
|---|---|---|---|
| CPU | Operation frequency 0.5GHz | Operation rate 0[%] | 10[mA] |
| | | Operation rate 1[%] | 11[mA] |
| | | Operation rate 2[%] | 13[mA] |
| | | Operation rate 3[%] | 16[mA] |
| | | ... | |
| | | Operation rate 100[%] | 200[mA] |
| | Operation frequency 1.0GHz | Operation rate 0[%] | 20[mA] |
| | | Operation rate 1[%] | 24[mA] |
| | | Operation rate 2[%] | 28[mA] |
| | | Operation rate 3[%] | 32[mA] |
| | | ... | |
| | | Operation rate 100[%] | 400[mA] |
| | Operation frequency 1.5GHz | Operation rate 0[%] | 30[mA] |
| | | Operation rate 1[%] | 36[mA] |
| | | Operation rate 2[%] | 42[mA] |
| | | Operation rate 3[%] | 48[mA] |
| | | ... | |
| | | Operation rate 100[%] | 600[mA] |
| GPU | Operation frequency 0.5GHz | Operation rate 0[%] | 10[mA] |
| | | Operation rate 1[%] | 11[mA] |
| | | Operation rate 2[%] | 13[mA] |
| | | Operation rate 3[%] | 16[mA] |
| | | ... | |
| | | Operation rate 100[%] | 200[mA] |
| | Operation frequency 1.0GHz | Operation rate 0[%] | 20[mA] |
| | | Operation rate 1[%] | 24[mA] |
| | | Operation rate 2[%] | 28[mA] |
| | | Operation rate 3[%] | 32[mA] |
| | | ... | |
| | | Operation rate 100[%] | 400[mA] |
| | Operation frequency 1.5GHz | Operation rate 0[%] | 30[mA] |
| | | Operation rate 1[%] | 36[mA] |
| | | Operation rate 2[%] | 42[mA] |
| | | Operation rate 3[%] | 48[mA] |
| | | ... | |
| | | Operation rate 100[%] | 600[mA] |

Fig.7

| Hardware name | Operating state | | | Current consumption |
|---|---|---|---|---|
| Display | Luminance 1 | | | 1[mA] |
| | Luminance 2 | | | 3[mA] |
| | Luminance 3 | | | 5[mA] |
| | ... | | | |
| | Luminance 255 | | | 200[mA] |
| 3G/LTE | 3G | Throughput 0[Mbps] | | 200[mA] |
| | | Throughput 0.1[Mbps] | | 201[mA] |
| | | Throughput 0.2[Mbps] | | 202[mA] |
| | | ... | | |
| | | Throughput 10[Mbps] | | 300[mA] |
| | LTE | Throughput 0[Mbps] | | 250[mA] |
| | | Throughput 0.1[Mbps] | | 251[mA] |
| | | Throughput 0.2[Mbps] | | 252[mA] |
| | | ... | | |
| | | Throughput 10[Mbps] | | 350[mA] |
| WiFi | Throughput 0[Mbps] | | | 200[mA] |
| | Throughput 0.1[Mbps] | | | 201[mA] |
| | Throughput 0.2[Mbps] | | | 202[mA] |
| | ... | | | |
| | Throughput 10[Mbps] | | | 300[mA] |

*Fig.8*

| Hardware name | Operating state | Current consumption |
|---|---|---|
| Bluetooth | Throughput 0[Mbps] | 200[mA] |
| | Throughput 0.1[Mbps] | 201[mA] |
| | Throughput 0.2[Mbps] | 202[mA] |
| | ... | |
| | Throughput 10[Mbps] | 300[mA] |
| File(Read/Write) | Throughput 0[Mbps] | 200[mA] |
| | Throughput 0.1[Mbps] | 201[mA] |
| | Throughput 0.2[Mbps] | 202[mA] |
| | ... | |
| | Throughput 10[Mbps] | 300[mA] |
| GPS | State ON | 100[mA] |
| Speaker | Volume 0[%] | 10[mA] |
| | Volume 1[%] | 12[mA] |
| | Volume 2[%] | 14[mA] |
| | ... | |
| | Volume 100[%] | 200[mA] |
| Sensor(acceleration) | State ON | 10[mA] |
| Sensor(geomagnetic) | State ON | 10[mA] |
| Sensor(gyro) | State ON | 10[mA] |

DEBUG DEVICE, DEBUG METHOD, AND DEBUG PROGRAM

TECHNICAL FIELD

The present invention relates to a debug device, a debug method, and a debug program for developing a computer program.

BACKGROUND ART

When a computer program. (software or an application) to be executed on a mobile terminal consumes much power in a mobile terminal such as a smartphone, battery capacity is reduced and the user is required to refrain from use of an application. Further, when the battery capacity is lost, it is impossible to use the mobile terminal at all. Therefore, a computer program which consumes as little power as possible is required.

Here, a software development device for developing software capable of saving power is conventionally known (for example, the following Patent Literature 1).

CITATION LIST

Patent Literature

[Patent Literature 1] Japanese Unexamined Patent Publication No. 2009-75965

SUMMARY OF INVENTION

Technical Problem

In the software development device disclosed in Patent Literature 1, power consumption by software is computed on the basis of unit power consumption of pre-measured hardware resources. However, because the power consumption (current consumption) of the hardware resources generally changes according to an operation situation of the hardware resources, there is a problem in that the software development device disclosed in Patent Literature 1 cannot compute accurate power consumption.

The present invention has been made in view of the above-described problems, and an objective is to provide a debug device, a debug method, and a debug program capable of more accurately computing current consumption or a current consumption quantity by a computer program to be executed by a mobile terminal.

Solution to Problem

To solve the above-described problem, a debug device of an aspect of the present invention is a debug device for computing current consumption or a current consumption quantity of a mobile terminal when a computer program is debugged in the mobile terminal, the debug device including: an acquisition means configured to acquire terminal log information indicating an operating state of hardware constituting the mobile terminal during debug execution; and a computation means configured to compute the current consumption or the current consumption quantity of the mobile terminal during the debug execution on the basis of the terminal log information acquired by the acquisition means and computation information for computing the unique current consumption or the unique current consumption quantity from the operating state of the hardware which is pre-stored.

According to this debug device, the terminal log information indicating the operating state of the hardware constituting the mobile terminal during the debug execution is acquired, and the current consumption or the current consumption quantity during the debug execution is computed based on the acquired terminal log information. When this configuration is adopted, it is possible to compute more accurate current consumption or a more accurate current consumption quantity because the current consumption or the current consumption quantity reflecting the actual operating state when the computer program is executed can be computed.

Also, the debug device of the aspect of the present invention further includes an acquisition timing setting means configured to set an acquisition timing of the terminal log information. Preferably, the acquisition means acquires the terminal log information on the basis of the acquisition timing set by the acquisition timing setting means. When this configuration is adopted, the convenience for a user (a computer program developer) is improved because the terminal log information can be acquired only at the timing, for example, at which the computation of the current consumption or the current consumption quantity is necessary, and the current consumption or the current consumption quantity at that timing can be computed.

Also, in the debug device of the aspect of the present invention, preferably, the acquisition timing setting means sets a predetermined range of the computer program and the acquisition means acquires the terminal log information when debugging is executed in the predetermined range of the computer program set by the acquisition timing setting means. When this configuration is adopted, the convenience for the user is improved because the terminal log information can be acquired only in the set range of the computer program, for example, the range in which the computation of the current consumption or the current consumption quantity, and the current consumption or the current consumption quantity of the range can be computed.

Also, the debug device of the aspect of the present invention further includes a threshold value setting means configured to set a threshold value of the current consumption or the current consumption quantity; and an execution means configured to determine whether the current consumption or the current consumption quantity computed by the computation means exceeds the threshold value set by the threshold value setting means and execute a specific process when it is determined that the current consumption or the current consumption quantity exceeds the threshold value. When this configuration is adopted, the convenience for the user is improved because the specific process can be executed when the current consumption or the current consumption quantity exceeds the threshold value, for example, when the debugging can be stopped when the current consumption or the current consumption quantity exceeds the set threshold value, etc.

Also, in the debug device of the aspect of the present invention, preferably, an acquisition means acquires terminal log information of each piece of hardware constituting the mobile terminal and a computation means computes the current consumption or the current consumption quantity of each piece of the hardware constituting the mobile terminal during the debug execution on the basis of the terminal log information for each piece of the hardware acquired by the acquisition means and computation information for computing the unique current consumption or the unique current consumption quantity from the operating state of the hardware which is pre-stored. When this configuration is adopted, it is possible to compute more accurate current consumption or a more accurate current consumption quantity of each piece of the hardware because the current consumption or the current consumption quantity of each piece of the hardware reflecting the actual operating state for each piece of the hardware when the computer program is executed can be computed.

Also, preferably, the debug device of the aspect of the present invention further includes a threshold value setting means configured to set a threshold value of the current consumption or the current consumption quantity of each piece of the hardware constituting the mobile terminal; and an execution means configured to determine whether the current consumption or the current consumption quantity of each piece of the hardware computed by the computation means exceeds the threshold value for each piece of the hardware set by the threshold value setting means and execute a specific process when it is determined that the current consumption or the current consumption quantity exceeds the threshold value. When this configuration is adopted, the convenience for the user is improved because the specific process can be executed when the current consumption or the current consumption quantity of each piece of the hardware exceeds the set threshold value, for example, when the debugging can be stopped when the current consumption or the current consumption quantity of each piece of the hardware exceeds the set threshold value, etc.

Also, in the debug device of the aspect of the present invention, preferably, the execution means outputs a position of the computer program in which the current consumption or the current consumption quantity exceeds the threshold value when it is determined that the current consumption or the current consumption quantity exceeds the threshold value. When this configuration is adopted, the convenience for the user is improved, for example, because the user can review the computer program of the output position and perform rewriting on a computer program having smaller current consumption or a smaller current consumption quantity.

Also, in the debug device of the aspect of the present invention, preferably, the execution means also outputs a correction candidate for the computer program based on the current consumption or the current consumption quantity computed by the computation means at the position of the computer program when the position of the computer program in which the current consumption or the current consumption quantity exceeds the threshold value is output. When this configuration is adopted, the time and effort of the user are reduced and the convenience is improved because a correction candidate for the computer program is automatically output.

It should be noted herein that the present invention can also be described as an invention of a debug method and a debug program as below, in addition to being described as the invention of the debug device as above. These are substantially the same invention with the same action and effect, and differ merely in category.

That is, a debug method according to an aspect of the present invention is a debug method to be executed by a debug device for computing current consumption or a current consumption quantity of a mobile terminal when a computer program is debugged in the mobile terminal, the debug method including: an acquisition step of acquiring terminal log information indicating an operating state of hardware constituting the mobile terminal during debug execution; and a computation step of computing the current consumption or the current consumption quantity of the mobile terminal during the debug execution on the basis of the terminal log information acquired in the acquisition step and computation information for computing the unique current consumption or the unique current consumption quantity from the operating state of the hardware which is pre-stored.

Also, a debug program according to an aspect of the present invention is a debug program for causing a computer to function as: an acquisition means configured to acquire terminal log information indicating an operating state of hardware constituting the mobile terminal when a computer program is debugged on the mobile terminal; and a computation means configured to compute the current consumption or the current consumption quantity of the mobile terminal during debug execution on the basis of the terminal log information acquired by the acquisition means and computation information for computing the unique current consumption or the unique current consumption quantity from the operating state of the hardware which is pre-stored.

Advantageous Effects of Invention

It is possible to more accurately compute current consumption or a current consumption quantity from a computer program to be executed in a mobile terminal.

BRIEF DESCRIPTION OF DRAWINGS

FIG. 5 is a diagram illustrating a table example of terminal log information.

FIG. 6 is a diagram of a first table example of a current consumption computation table.

FIG. 7 is a diagram of a second table example of a current consumption computation table.

FIG. 8 is a diagram of a third table example of a current consumption computation table.

DESCRIPTION OF EMBODIMENTS

The preferred embodiments of a device, a method, and a program according to the present invention will be described below in detail with reference to the drawings. The same elements will be denoted by the same reference symbols throughout the description of the drawings, without redundant description.

Figure 1:
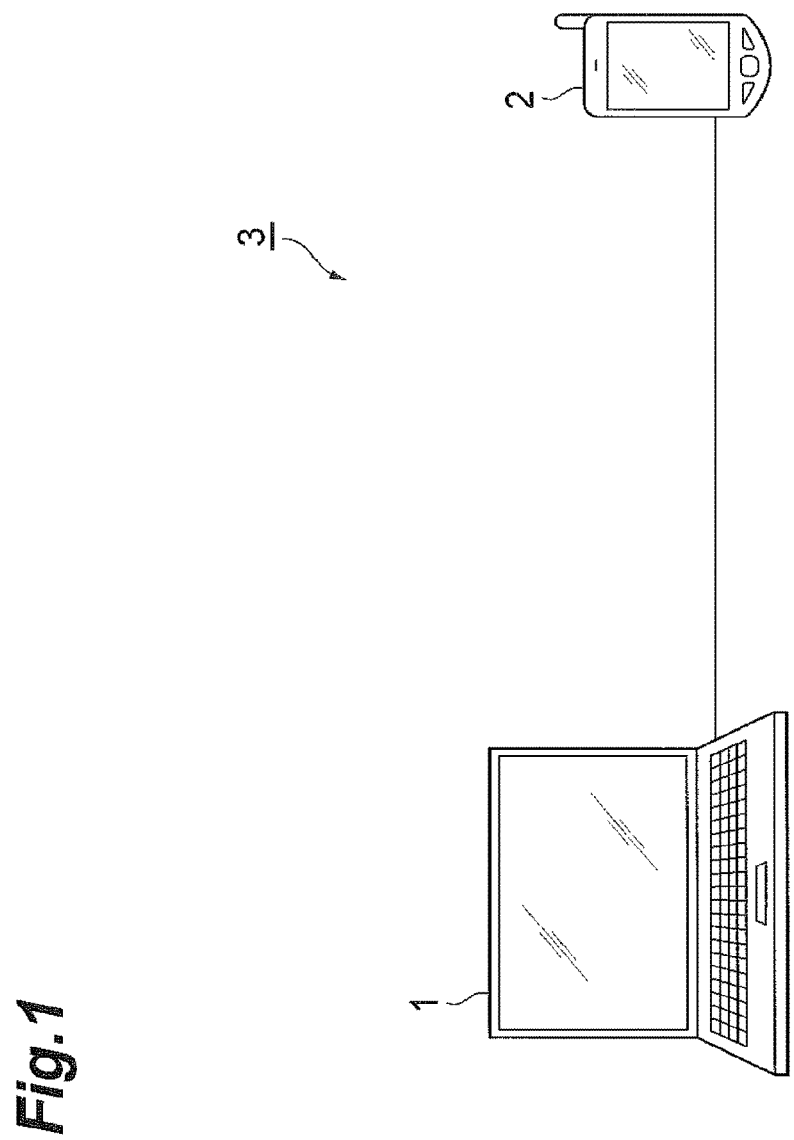
FIG. 1 is a configuration diagram of a debug device according to first and second embodiments of the present invention.

FIG. 1 is a configuration diagram of a debug system 3 including a debug device 1 according to this embodiment. As illustrated in FIG. 1, the debug system 3 is configured to include the debug device 1 and a mobile terminal 2. The debug device 1 and the mobile terminal 2 are mutually connected through a wired or wireless network by a user (computer program developer) during debugging.

The debug device 1 computes current consumption or a current consumption quantity of the mobile terminal 2 when a computer program is debugged in the mobile terminal 2. The debug device 1 is constituted of a general computer, and the debug program 60 to be described below on the computer is executed, so that the debug function is provided. The user debugs the computer program which is a debug target by manipulating the debug device 1.

The mobile terminal 2 is constituted of a smartphone, a mobile telephone, or the like. The computer program of the debug target operates in the mobile terminal 2 and the computer program of the debug target is executed on the mobile terminal 2 by transmitting and receiving an instruction or information from the debug device 1 to the mobile terminal 2 via a network and a result of debug execution by the debug device 1 can be confirmed.

Figure 2:
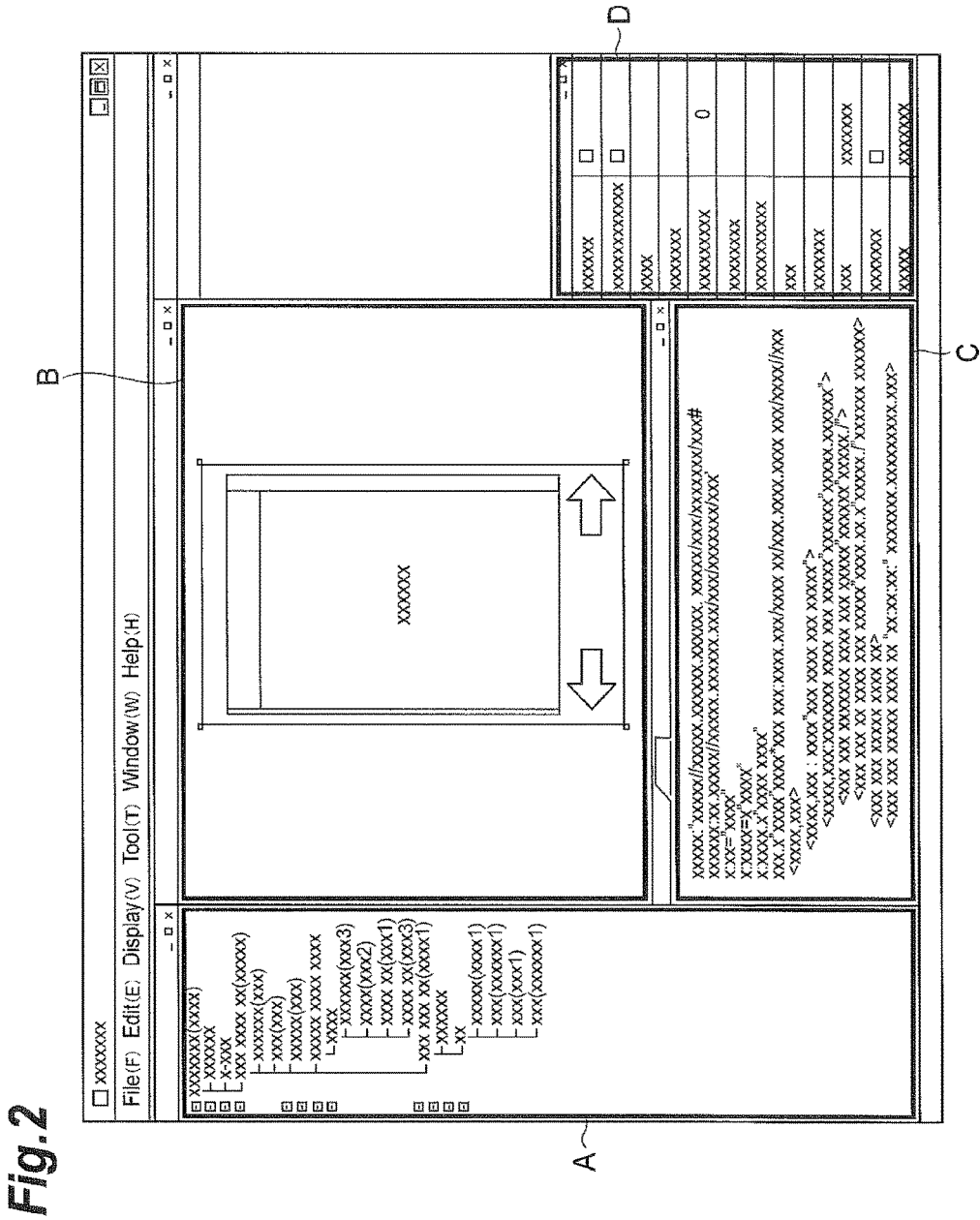
FIG. 2 is a diagram illustrating a screen example of a debug application executed by the debug device according to the first and second embodiments of the present invention.

FIG. 2 is a diagram illustrating a screen example of a debug application for employing the debug function provided by the debug device 1. The debug application is constituted of a plurality of window areas as in a general debug application. As in a screen example of the debug application illustrated in FIG. 2, a screen includes an area A in which a file tree of the computer program of the debug target is displayed, an area B in which a screen image of a present development target is displayed, an area C in which a program code of the present development target is displayed, an area D in which a value such as a variable during debug execution is displayed in real time, etc. In the debug device 1 according to this embodiment, as will be described below, an acquisition timing of terminal log information is set in the areas A to C and information about current consumption or a current consumption quantity is displayed in the area D.

[First Embodiment]

Figure 3:
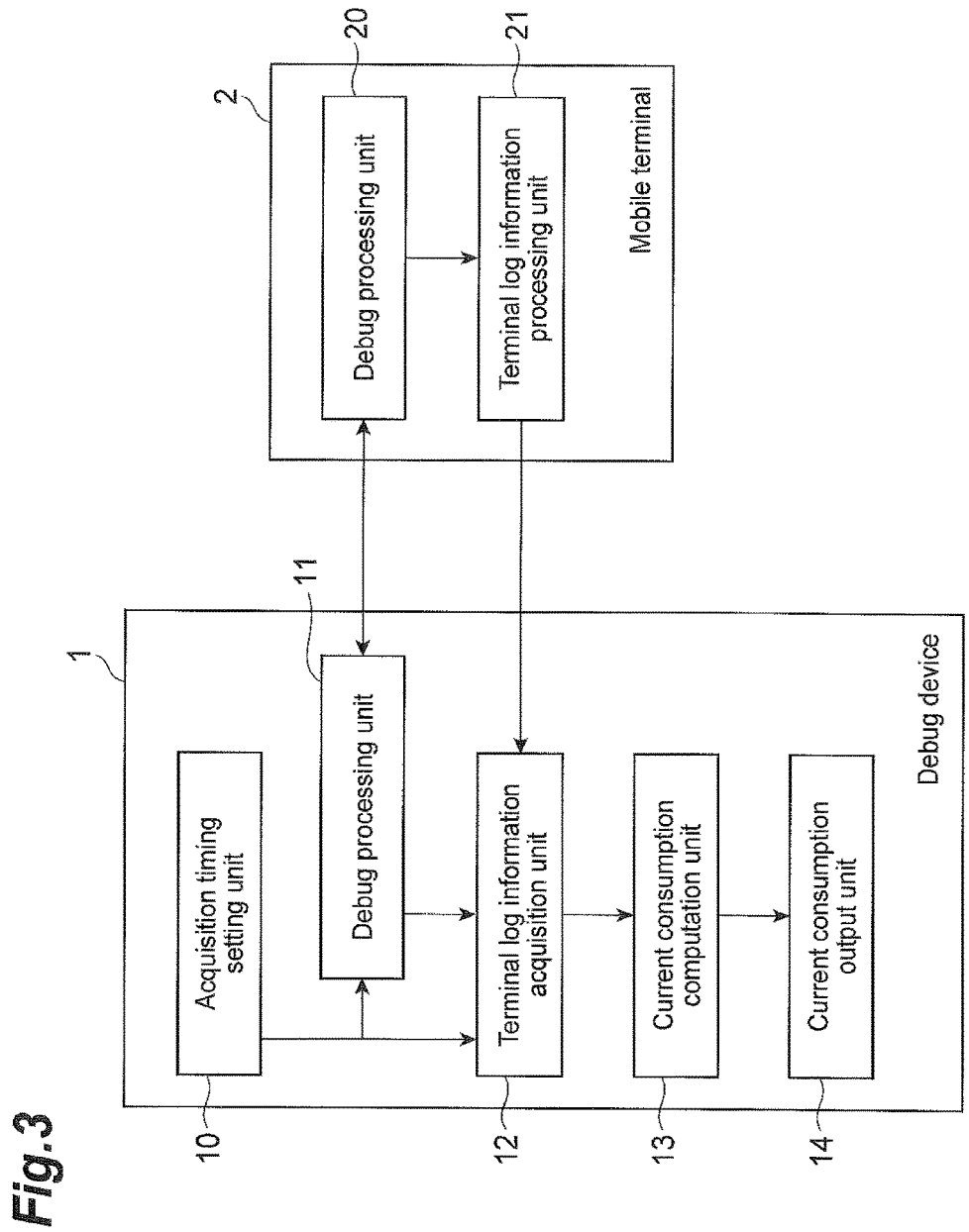
FIG. 3 is a functional block diagram of the debug device according to the first embodiment of the present invention.

FIG. 3 is a functional block diagram of the debug device 1 and the mobile terminal 2 according to the first embodiment of the present invention. As illustrated in FIG. 1, the debug device 1 is configured to include an acquisition timing setting unit 10 (acquisition timing setting means), a debug processing unit 11, a terminal log information acquisition unit 12 (acquisition means), a current consumption computation unit 13 (computation means), and a current consumption output unit 14. Also, the mobile terminal 2 is configured to include a debug processing unit 20 and a terminal log information processing unit 21.

Figure 4:
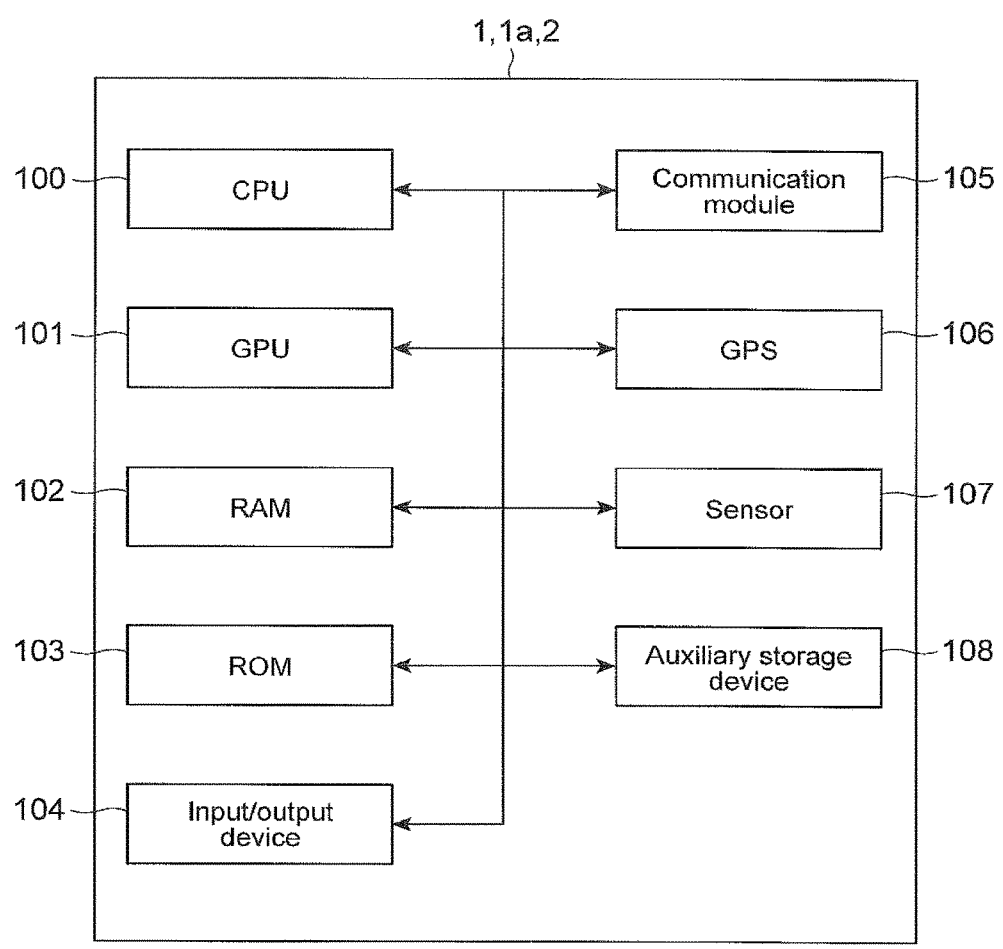
FIG. 4 is a diagram illustrating a hardware configuration of the debug device according to the first and second embodiments of the present invention.

The debug device 1 and the mobile terminal 2 are constituted of hardware such as a CPU or the like. FIG. 4 is a diagram illustrating an example of a hardware configuration of the debug device 1 and the mobile terminal 2. As illustrated in FIG. 4, the debug device 1 and the mobile terminal 2 illustrated in FIG. 3 are physically constituted of a CPU 100 which is a central processing device, a GPU 101 which is a processing unit for image processing, a RAM 102 and a ROM 103 which are primary storage devices, an input/output device 104 such as a display, a communication module 105, a GPS 106 which is a position information acquisition device, a sensor 107 including an acceleration sensor, a geomagnetic sensor, or a gyro sensor, an auxiliary storage device 108, etc. as a computer system.

Functions of functional blocks of the debug device 1 and the mobile terminal 2 illustrated in FIG. 3 are implemented by loading predetermined computer software on hardware of the CPU 100, the GPU 101, the RAM 102, etc. illustrated in FIG. 4 to operate the input/output device 104, the communication module 105, the GPS 106, the sensor 107, and the auxiliary storage device 108 under control of the CPU 100 and the GPU 101 and read and write data from and to the RAM 102.

Next, each functional block of the debug device 1 illustrated in FIG. 3 will be described.

The acquisition timing setting unit 10 sets an acquisition timing of terminal log information (to be described below) indicating an operating state (at present) of hardware constituting the mobile terminal 2 on the basis of the user's instruction or the like. The acquisition timing setting unit 10 may set a predetermined range of the computer program. For example, as a specific example of the acquisition timing, a line (start point) of the computer program for starting the acquisition of the terminal log information, a line (end point) of the computer program for ending the acquisition of the terminal log information, a function of the computer program for performing the acquisition of the terminal log information, a screen for performing the acquisition of the terminal log information (a screen implemented by the computer program), etc. are included. Also, the acquisition timing setting unit 10 may also set an acquisition frequency at which the terminal log information is acquired periodically (for example, every 1 sec) as the acquisition timing. Also, the acquisition timing is in a power (current) measurement target range.

The debug processing unit 11 performs a debug process provided in a general debug application. For example, the debug processing unit 11 transfers (synchronizes) the computer program of the debug target to the mobile terminal 2. Also, the debug processing unit 11 transmits a debug execution instruction from the user to the mobile terminal 2 and performs the debug execution in the mobile terminal 2. Also, the debug processing unit 11 transmits an instruction related to another debug process from the user to the mobile terminal 2 and receives a response from the mobile terminal 2 to perform a specific process. Also, the debug processing unit 11 receives an instruction related to the debug process from the mobile terminal 2 to perform a specific process.

The terminal log information acquisition unit 12 acquires the terminal log information from the mobile terminal 2 during debug execution. The terminal log information acquisition unit 12 may acquire the terminal log information on the basis of an acquisition timing set by the acquisition timing setting unit 10. The terminal log information acquisition unit 12 may acquire the terminal log information when debugging is executed in the predetermined range of the computer program set by the acquisition timing setting unit 10. The terminal log information acquisition unit 12 may acquire the terminal log information for each piece of the hardware constituting the mobile terminal 2.

FIG. 5 is a diagram illustrating a table example of terminal log information. As illustrated in FIG. 5, the terminal log information is associated with a name of each piece of the hardware constituting the mobile terminal 2, a name indicating an operating state, and a value of a present time (a time of acquiring the terminal log information) of the operating state. For example, the terminal log information illustrated in FIG. 5 indicates that a present operation frequency of the CPU is 0.5 GHz and an operation rate is 10%.

The current consumption computation unit 13 computes current consumption or a current consumption quantity of the mobile terminal 2 during debug execution on the basis of the terminal log information acquired by the terminal log information acquisition unit 12 and computation information for computing unique current consumption or a unique current consumption quantity from the operating state of the hardware which is pre-stored. The current consumption computation unit 13 computes current consumption or a current consumption quantity of each piece of the hardware constituting the mobile terminal 2 during debug execution on the basis of the terminal log information of each piece of the hardware acquired by the terminal log information acquisition unit 12 and computation information for computing unique current consumption or a unique current consumption quantity from the operating state of the hardware which is pre-stored. Also, the computation information is pre-stored in a memory or the like of the debug device 1.

As a specific example of the computation information, a current consumption computation table is included. FIGS. 6 to 8 are diagrams illustrating table examples of the current consumption table. As illustrated in FIGS. 6 to 8, a name, an operating state, and current consumption of each piece of the hardware constituting the mobile terminal 2 are associated in the current consumption computation table. For example, the current consumption computation table illustrated in FIG. 6 indicates that the current consumption becomes 16 mA when the operation rate is 3% at the operation frequency of the CPU of the mobile terminal 2 of 0.5 GHz. For example, the current consumption computation unit 13 computes the current consumption as 16 mA from the above-described content of "the current consumption is 16 mA when the operation rate is 3% at the operation frequency of 0.5 GHz of the CPU" in the current consumption computation table illustrated in FIG. 6 when the terminal log information acquired by the terminal log information acquisition unit 12 indicates the "operation frequency of the CPU is 0.5 GHz and the operation rate is 3%" as described above and computes the current consumption of the CPU of the mobile terminal 2 during debug execution on the basis of the computed value.

Also, although the current consumption is associated with the operation rate every 1% in the current consumption computation table illustrated in FIG. 6, it is not limited to 1% and different operation rates may be associated with other units. Also, the operation rate of 0% is an operation rate considering an offset. The above points also apply to the content of FIGS. 7 and 8.

Specific examples of the computation information include examples of equations shown below.
[Example of Linear Equation]
P=ax+b (P: current consumption, a: coefficient determined for each piece of hardware, x: variable for each piece of hardware, b: offset)
[Example of Quadratic Equation]
P=ax^2+bx+c (P: current consumption, a, b: coefficient determined for each piece of hardware, x: variable for each piece of hardware, c: offset)
[Example of Non-Linear Function]
P=$f_a$(x) (P: current consumption, $f_a$(x): non-linear function having hardware as variable, and x: variable for each piece of hardware)
The current consumption computation unit 13 computes the current consumption of the mobile terminal 2 during debug execution on the basis of the terminal log information acquired by the terminal log information acquisition unit 12 and the equations shown above as examples.

Also, a method of computing current consumption for each piece of the hardware by the current consumption computation unit 13 is a method of computing current consumption for the acquired terminal log information and sequentially integrating the current consumption within the power (current) measurement target range. Also, as another method, the current consumption from the start point to the end point may be integrated when the current consumption is computed for acquired terminal log information and reaches the end point of the power (current) measurement target range. Also, as another method, terminal log information from the start point to the end point may be collected when the acquired terminal log information is held and the end point of the power (current) measurement target range is reached and the current consumption may be computed from a result of the collected terminal log information. Also, although the current consumption has been described in the above specific example, the same is also true for the current consumption quantity. That is, "current consumption" may be replaced with "current consumption quantity" in the above specific example.

The current consumption output unit 14 outputs a sum value of the current consumption or the current consumption quantity of each piece of the hardware computed by the current consumption computation unit 13. For example, the current consumption output unit 14 displays the current consumption or the current consumption quantity on a screen (the area D of FIG. 2) of the debug device 1 and transmits the current consumption or the current consumption quantity to the other device via the network. Also, the current consumption output unit 14 may output the computed current consumption or current consumption quantity to each piece of the hardware (the CPU, the GPU, the GPS, or the like).

Each functional block of the mobile terminal 2 illustrated in FIG. 3 will be described.

The debug processing unit 20 performs a debug process in cooperation with a process of the debug processing unit 11 of the above-described debug device 1. For example, the debug processing unit 20 sets the computer program of a debug target transmitted from the debug processing unit 11 in the mobile terminal 2 and is in a state in which the debug execution can be performed. Also, the debug processing unit 20 receives an instruction of debug execution from the user transmitted from the debug processing unit 11 and performs the debug execution in the mobile terminal 2. Also, the debug processing unit 20 receives an instruction related to the other debug process from the user transmitted from the debug processing unit 11, performs a corresponding debug process in the mobile terminal 2, and returns a response to the instruction to the debug processing unit 11. Also, the debug processing unit 20 transmits the instruction related to the debug process to the debug processing unit 11.

The terminal log information processing unit 21 acquires the terminal log information of the mobile terminal 2 on the basis of the instruction from the debug processing unit 20 and transmits the acquired terminal log information to the terminal log information acquisition unit 12 of the debug device 1.

Figure 9:
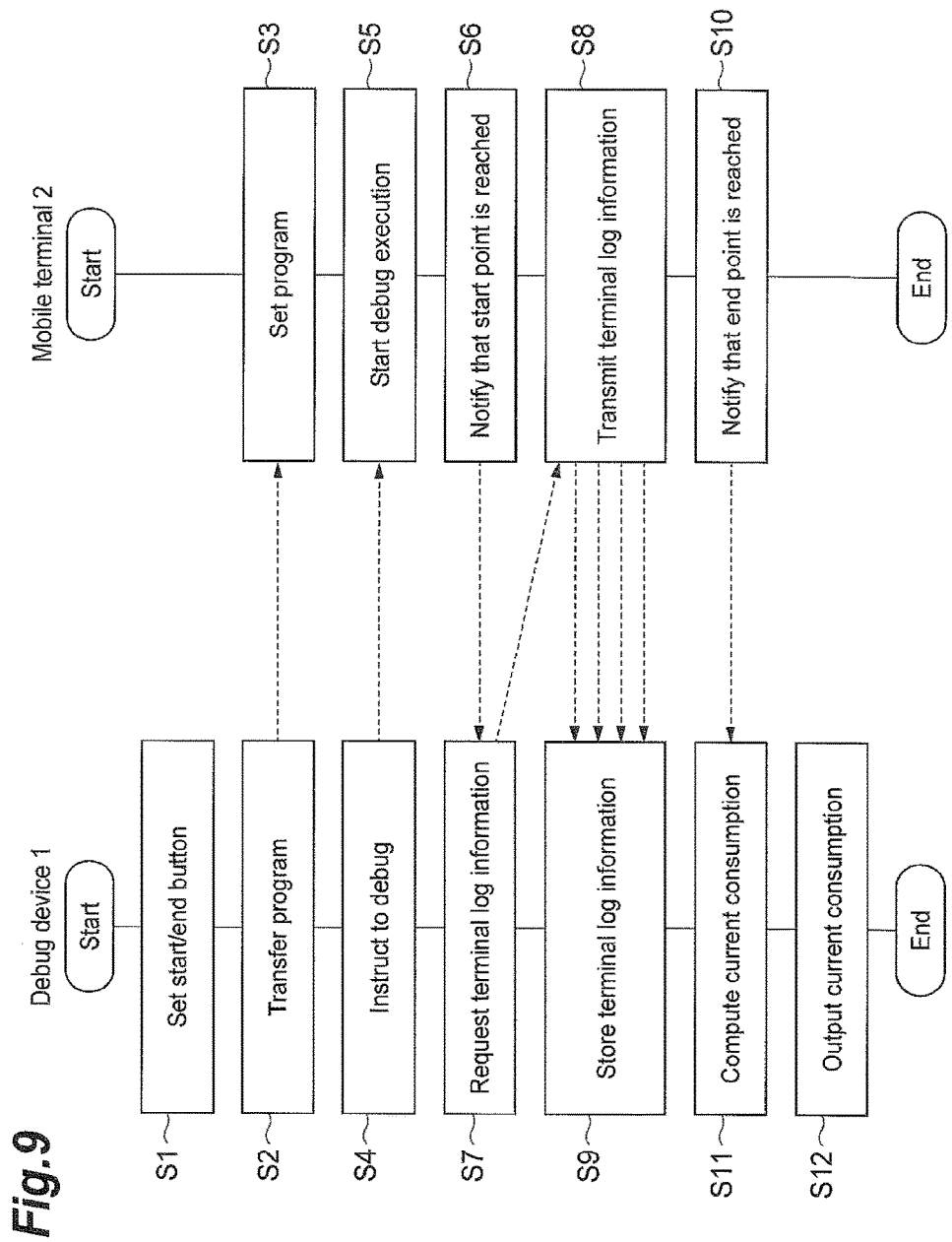
FIG. 9 is a flowchart illustrating a processing example (debug method) executed by the debug device according to the first embodiment of the present invention.

Next, a specific processing example of a debug method in the debug system 3 including the debug device 1 will be described using a flowchart illustrated in FIG. 9.

First, the start point and the end point are set by the acquisition timing setting unit 10 of the debug device 1 (step S1). Next, the debug processing unit 11 of the debug device 1 transfers the computer program of the debug target to the mobile terminal 2 (step S2) and the debug processing unit 20 of the mobile terminal 2 sets the transferred computer program in the mobile terminal (step S3). Next, the debug processing unit 11 of the debug device 1 instructs the mobile terminal 2 to debug (step S4) and the debug processing unit 11 of the mobile terminal 2 starts to debug the computer program on the basis of the instruction (step S5).

When the set start point is reached after the debugging starts in the mobile terminal 2, the debug processing unit 20 of the mobile terminal 2 notifies the debug device 1 that the set start point is reached (step S6). Next, the notification is received by the debug processing unit 11 of the debug device 1 and a request of the terminal log information is transmitted to the mobile terminal 2 (step S7). Next, the request is received by the debug processing unit 20 of the mobile terminal 2, the terminal log information of the mobile terminal 2 is acquired, and the acquired terminal log information is transmitted to the debug device 1 (step S8). Next, the transmitted terminal log information is acquired by the terminal log information acquisition unit 12 of the debug device 1 and stored in a memory or the like of the debug device 1 (acquisition step in step S9).

When the debug execution reaches the set end point after debug execution starts in the mobile terminal 2, the debug processing unit 20 of the mobile terminal 2 notifies the debug device 1 that the set end point is reached (step S10). The notification is received by the debug processing unit 11 of the debug device 1 and the current consumption computation unit 13 computes current consumption or a current consumption quantity on the basis of the terminal log information stored in S9 according to an instruction of the debug processing unit 11 (computation step in step S11). Next, the current consumption output unit 14 of the debug device 1 outputs the computed current consumption or current consumption quantity (step S12).

Here, as the function of the debug processing unit 11 of the debug device 1, a command of a predetermined point on the computer program is rewritten with a command of which the computer program notifies the debug processing unit 11 of the debug device 1 and the command is configured to be actually executed immediately after the, acquisition of the terminal log information starts. Alternatively, a virtual machine (VM) on the terminal may use a debug function provided as in the above-described example.

Next, the action and effect of the debug device 1 configured as in this embodiment will be described.

According to the debug device 1 of this embodiment, the terminal log information indicating the operating state of the hardware constituting the mobile terminal 2 during the debug execution is directly acquired from the mobile terminal 2 and current consumption or a current consumption quantity of each piece of the hardware of the mobile terminal 2 during the debug execution or a total value of current consumption or current consumption quantities of all pieces of the hardware is computed on the basis of the acquired terminal log information. When this configuration is adopted, more accurate current consumption or a more accurate current consumption quantity can be computed because it is possible to compute current consumption or a current consumption quantity reflecting an actual operating state of the hardware and compute current consumption or a current consumption quantity suitable for each model when the computer program is executed.

Also, according to the debug device 1 of this embodiment, the convenience for the user (computer program developer) is improved because it is possible to acquire terminal log information only at the set timing, for example, the timing at which the computation of current consumption or current consumption quantity is required, and compute the current consumption or the current consumption quantity at that timing.

Also, according to the debug device 1 of this embodiment, the convenience for the user is improved because it is possible to acquire terminal log information only in a range of the set computer program, for example, a range in which the computation of current consumption or a current consumption quantity is required, and it is possible to compute the current consumption or the current consumption quantity of that range.

Also, according to the debug device 1 of this embodiment, more accurate current consumption or a more accurate current consumption quantity of each piece of hardware can be computed because it is possible to compute current consumption or a current consumption quantity of each piece of the hardware reflecting an actual operating state of each piece of the hardware when the computer program is executed.

[Second Embodiment]

Next, the debug device 1a according to the second embodiment of the present invention will be described. Also, only differences from the debug device 1 according to the first embodiment will be described below and other parts are similar to those of the debug device 1.

Figure 10:
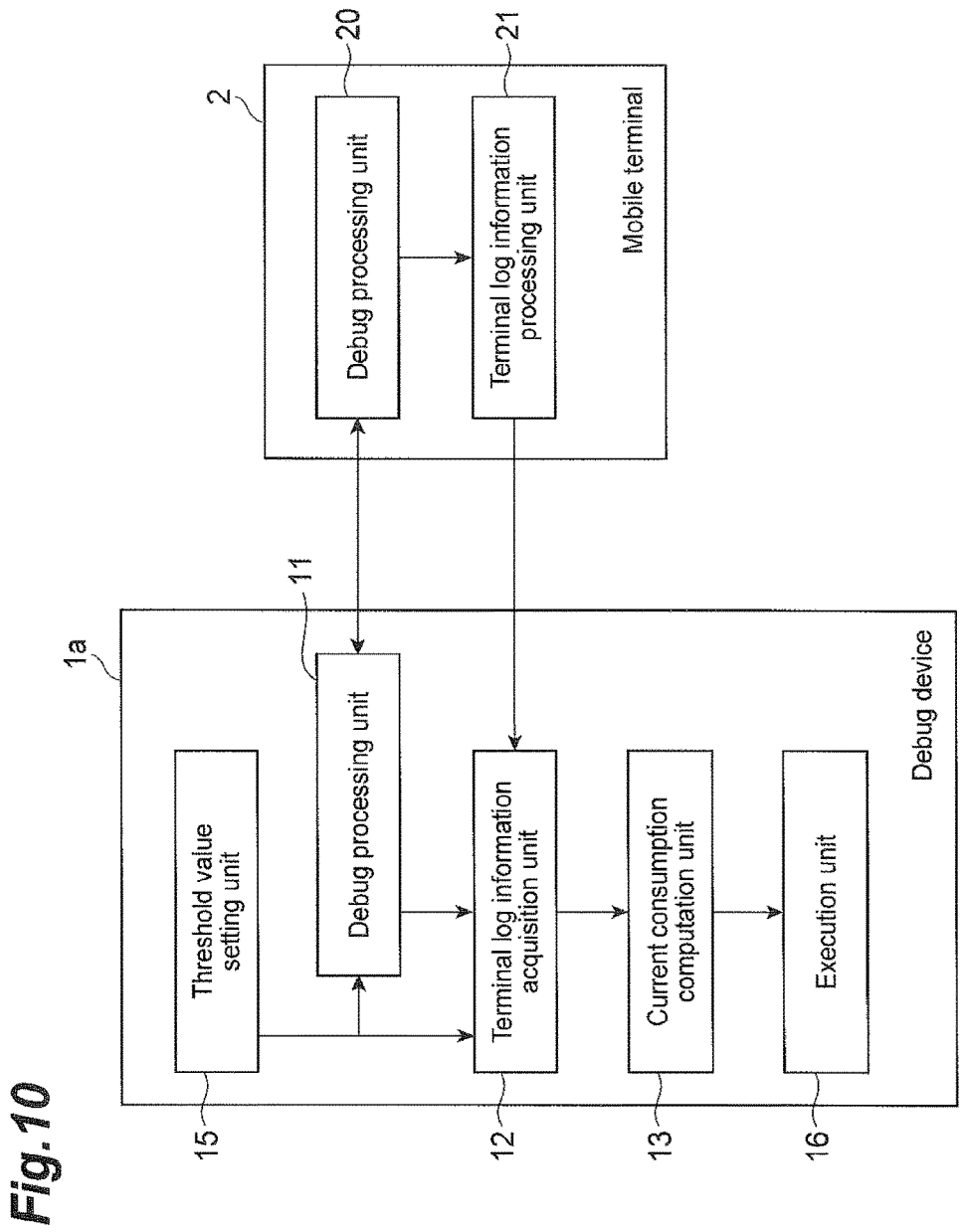
FIG. 10 is a functional block diagram of the debug device according to the second embodiment of the present invention.

FIG. 10 is a functional block diagram of the debug device 1a and the mobile terminal 2 according to the second embodiment of the present invention. As illustrated in FIG. 10, the debug device 1 is configured to include a debug processing unit 11, a terminal log information acquisition unit 12 (acquisition means), a current consumption computation unit 13 (computation means), a threshold value setting unit 15 (threshold value setting means), and an execution unit 16 (execution means). Also, the mobile terminal 2 is similar to that shown in the functional block diagram of the first embodiment.

Similar to the debug device 1, the debug device 1a illustrated in FIG. 10 is physically configured as a computer system including a CPU 100, a GPU 101, a RAM 102, a ROM 103, an input/output device 104, a communication module 105, a GPS 106, a sensor 107, an auxiliary storage device 108, etc. as illustrated in FIG. 4.

A function of each functional block of the debug device 1a illustrated in FIG. 10 is implemented by reading predetermined computer software onto hardware of the CPU 100, the GPU 101, the RAM 102, or the like illustrated in FIG. 4 to operate the input/output device 104, the communication module 105, the GPS 106, the sensor 107, and the auxiliary storage device 108 under control of the CPU 100 and the GPU 101 and read and write data from and to the RAM 102.

Next, each functional block of the debug device 1a illustrated in FIG. 10 and differences from the debug device 1 will be described.

The threshold value setting unit 15 sets a threshold value of current consumption or a current consumption quantity designated by the user or the like. The threshold value setting unit 15 may set the threshold value of the current consumption or the current consumption quantity of each piece of the hardware constituting the mobile terminal 2. That is, the threshold value of the current consumption or the current consumption quantity may be set for each piece of the hardware or set for a total value of current consumption or current consumption quantities of all pieces of the hardware. For example, the threshold value setting unit 15 may set the threshold value of the current consumption for each one or more pieces of the hardware such as setting the threshold value of the current consumption of a CPU to 100 mA, setting the threshold value of the current consumption of a GPU of an operation frequency of 0.5 GHz to 50 mA, and setting the current consumption of LTE to 300 mA. Likewise, the threshold value setting unit 15 may also set the threshold value of the current consumption quantity.

The execution unit 16 determines whether the current consumption or current consumption quantity computed by the current consumption computation unit 13 exceeds the threshold value set by the threshold value setting unit 15, and executes a specific process when the current consumption or current consumption quantity exceeds the threshold value. Also, the execution unit 16 determines whether the current consumption or current consumption quantity of each piece of the hardware computed by the current consumption computation unit 13 exceeds the threshold value of the hardware set by the threshold value setting unit 15, and executes a specific process when the current consumption or current consumption quantity exceeds the threshold value.

Specifically, the execution unit 16 may display information of the hardware when it is determined that the current consumption or the current consumption quantity of each piece of the hardware computed by the current consumption computation unit 13 exceeds the threshold value of the hardware set by the threshold value setting unit 15. In this case, the execution unit 16, for example, displays a name of hardware, an operating state at that time, and current consumption or a current consumption quantity as information of the hardware. Also, when it is determined that the current consumption or the current consumption quantity exceeds the threshold value, the execution unit 16 may output a position of a computer program in which the current consumption or the current consumption quantity exceeds the threshold value. Also, when a position of the computer program in which the current consumption or the current consumption quantity exceeds the threshold value is output, the execution unit 16 may also output a correction candidate for a computer program based on the current consumption or the current consumption quantity computed by the current consumption computation unit 13 at the position of the computer program. For example, when the hardware exceeding the threshold value of the current consumption or the current consumption quantity is a GPS, the execution unit 16 outputs a correction candidate for a computer program for reducing a frequency of communication from "once a minute" to "once every five minutes."

Figure 11:
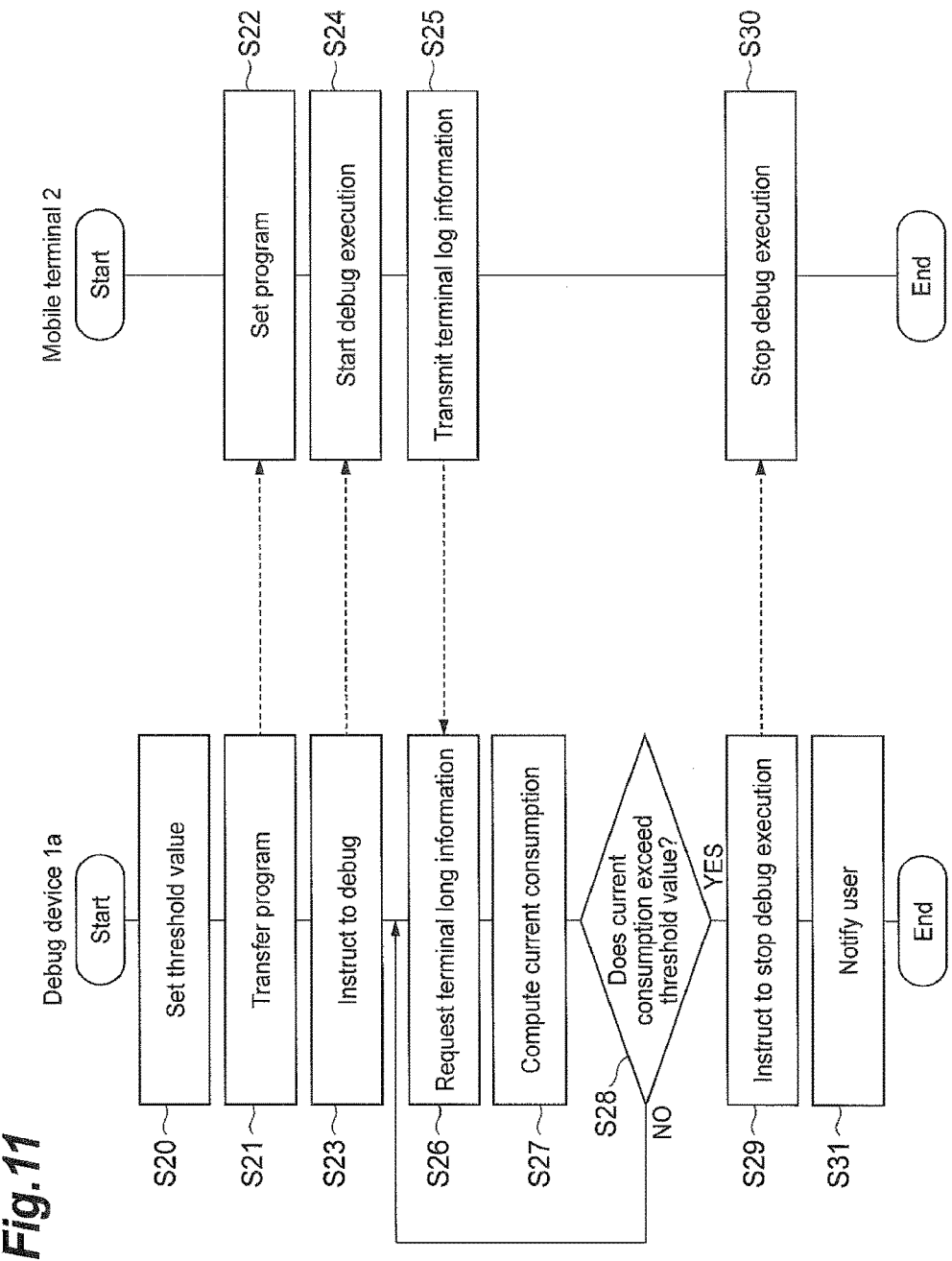
FIG. 11 is a flowchart illustrating a processing example (debug method) executed by the debug device according to the second embodiment of the present invention.

Next, a specific processing example of a debug method in the debug system 3 including the debug device 1*a* will be described using the flowchart illustrated in FIG. 11.

First, the threshold value setting unit 15 of the debug device 1*a* sets the threshold value (step S20). Next, the debug processing unit 11 of the debug device 1*a* transfers the computer program of the debug target to the mobile terminal 2 (step S21) and the debug processing unit 20 of the mobile terminal 2 sets the transferred computer program in the mobile terminal 2 (step S22). Next, the debug processing unit 11 of the debug device 1*a* instructs the mobile terminal 2 to debug (step S23) and the debug processing unit 11 of the mobile terminal 2 starts debug execution of the computer program on the basis of the instruction (step S24).

After the debug execution starts in the mobile terminal 2, the debug processing unit 20 of the mobile terminal 2 acquires terminal log information and transmits the acquired terminal log information to the debug device 1*a* (step S25), and the terminal log information is acquired by the terminal log information acquisition unit 12 of the debug device 1*a* and stored in a memory of the debug device 1*a* or the like (acquisition step of step S26).

Next, the current consumption computation unit 13 of the debug device 1*a* computes the current consumption or the current consumption quantity on the basis of the terminal log information stored in S26 (computation step of step S27). Next, the execution unit 16 of the debug device 1*a* determines whether the current consumption or the current consumption quantity computed in S27 exceeds the threshold value set in S20 (step S28). When it is determined that the current consumption or the current consumption quantity exceeds the threshold value, the execution unit 16 of the debug device 1*a* instructs the mobile terminal 2 to stop the debug execution (step S29) and the debug processing unit 11 of the mobile terminal 2 stops the debug execution of the computer program on the basis of the instruction (step S30). Next, the user is notified of a range of the computer program in which the current consumption or the current consumption quantity exceeds the threshold value (step S31).

Next, the action and effect of the debug device 1*a* configured as in this embodiment will be described.

According to the debug device 1*a* of this embodiment, the convenience for the user is improved because a specific process can be executed when the current consumption or the current consumption quantity exceeds the set threshold value, for example, when the debugging can be stopped when the current consumption or the current consumption quantity exceeds the set threshold value, etc.

According to the debug device 1*a* of this embodiment, the convenience for the user is improved because the specific process can be executed when the current consumption or the current consumption quantity of each piece of hardware exceeds the set threshold value, for example, when the debugging can be stopped when the current consumption or the current consumption quantity of each piece of the hardware exceeds the set threshold value, etc.

According to the debug device 1*a* of this embodiment, the convenience for the user is improved because information of the hardware can be displayed when the current consumption or current consumption quantity of each piece of the hardware exceeds the set threshold value, for example, because the information becomes effective reference information when the user develops software capable of saving power.

Also, according to the debug device 1*a* of this embodiment, for example, the convenience for the user is improved because the user can review the computer program of the output position and perform rewriting on a computer program having smaller current consumption or a smaller current consumption quantity.

Also, according to the debug device 1*a* of this embodiment, time and effort of the user are reduced and the convenience is improved because a correction candidate for the computer program is automatically output.

[Debug Program]

Figure 12:
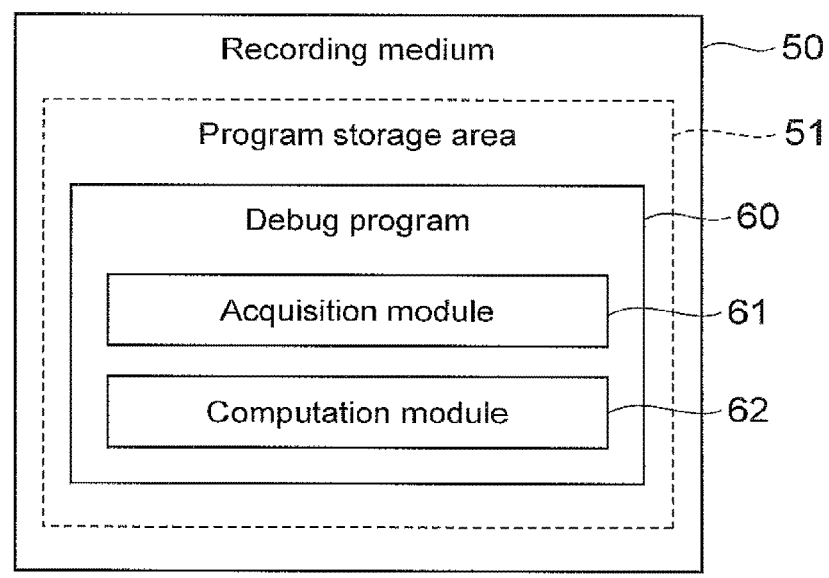
FIG. 12 is a diagram illustrating a configuration of the debug program according to the first and second embodiments of the present invention along with a storage medium.

Next, a debug program 60 for causing the computer to execute the above-described series of processes by the debug device 1 will be described. As illustrated in FIG. 12, the debug program 60 is inserted into the computer and accessed or stored within a program storage area 51 formed in a recording medium 50 provided in the computer. More specifically, the debug program 60 is stored within the program storage area 51 formed in the recording medium 50 provided in the debug device 1.

The debug program 60 is configured to include an acquisition module 61 and a computation module 62. Functions to be implemented by executing the acquisition module 61 and the computation module 62 are similar to those of the terminal log information acquisition unit 12 and the current consumption computation unit 13 of the debug device 1 described above.

Also, some or all of debug programs 60 may be configured to be transmitted via a transmission medium such as a communication line or the like and received and recorded (installed) by other devices. Also, each module of the debug program 60 may be installed in any of a plurality of computers as well as one computer. In this case, a computer system based on the plurality of computers performs the above-described series of processes of the debug program 60.

According to the debug device 1 or the debug device 1a according to this embodiment as described above, it is possible to perform application development for reducing current consumption or a current consumption quantity in the mobile terminal because current consumption or a current consumption quantity related to consumption by each screen, function, or line of the computer program is specified and debugging can be performed, and it is possible to consequently use the mobile terminal for a long time.

Also, the debug device 1 may delete some provided functions and have some functions provided in the debug device 1a. Likewise, the debug device 1a may delete some provided functions and have some functions provided in the debug device 1.

REFERENCE SINGS LIST 1, 1a Debug device
2 Mobile terminal
3 Debug system
10 Acquisition timing setting unit
11 Debug processing unit
12 Terminal log information acquisition unit
13 Current consumption computation unit
14 Current consumption output unit
15 Threshold value setting unit
16 Execution unit
20 Debug processing unit
21 Terminal log information processing unit
50 Recording medium
51 Program storage area
60 Debug program
61 Acquisition module
62 Computation module

The invention claimed is:

1. A debug method to be executed by hardware circuitry of a debug device for computing an electric current consumption or an electric current consumption quantity of a mobile terminal when a computer program is debugged in the mobile terminal, the debug method comprising:

an acquisition step of acquiring terminal log information indicating an operating state of hardware constituting the mobile terminal during debug execution;

a computation step of computing the electric current consumption or the electric current consumption quantity of the mobile terminal during the debug execution on the basis of the terminal log information acquired in the acquisition step and computation information for computing a unique electric current consumption or a unique electric current consumption quantity from the operating state of the hardware which is pre-stored;

a threshold value setting step of setting a threshold value of the electric current consumption or the electric current consumption quantity; and an execution step of determining whether the electric current consumption or the electric current consumption quantity computed in the computation step exceeds the threshold value set in the threshold value setting step and executing a specific process when it is determined that the electric current consumption or the electric current consumption quantity exceeds the threshold value, wherein the execution step includes outputting a position of the computer program in which the electric current consumption or the electric current consumption quantity exceeds the threshold value when it is determined that the electric current consumption or the electric current consumption quantity exceeds the threshold value: and outputting a correction candidate for the computer program based on the computed electric current consumption or the computed electric current consumption quantity at the position of the computer program when the position of the computer program in which the electric current consumption or the electric current consumption quantity exceeds the threshold value is output.

2. A debug device for computing an electric current consumption or an electric current consumption quantity of a mobile terminal when a computer program is debugged in the mobile terminal, the debug device comprising hardware circuitry configured to:

acquire, from the mobile terminal, terminal log information indicating an operating state of hardware constituting the mobile terminal during debug execution of the computer program in the mobile terminal;

compute the electric current consumption or the electric current consumption quantity of the mobile terminal during the debug execution on the basis of the acquired terminal log information and computation information for computing a unique electric current consumption or a unique electric current consumption quantity from the operating state of the hardware which is pre-stored;

set a threshold value of the electric current consumption or the electric current consumption quantity; and determine whether the computed electric current consumption or the computed electric current consumption quantity exceeds the threshold value and execute a specific process when it is determined that the electric current consumption or the electric current consumption quantity exceeds the threshold value, wherein the hardware circuitry is further configured to output a position of the computer program in which the electric current consumption or the electric current consumption quantity exceeds the threshold value when it is determined that the electric current consumption or the electric current consumption quantity exceeds the threshold value; and output a correction candidate for the computer program based on the computed electric current consumption or the computed electric current consumption quantity at the position of the computer program when the position of the computer program in which the electric current consumption or the electric current consumption quantity' exceeds the threshold value is output.

3. The debug device according to claim 2, wherein the hardware circuitry is further configured to;

set an acquisition timing of the terminal log information; and acquire the terminal log information from the mobile terminal on the basis of the acquisition timing.

4. The debug device according to claim 3, wherein the hardware circuitry is further configured to:

set a predetermined range of the computer program; and acquire the terminal log information from the mobile terminal when debugging is executed in the predetermined range of the computer program.

5. A debug device for computing an electric current consumption or an electric current consumption quantity of a mobile terminal when a computer program is debugged in the mobile terminal, the debug device comprising hardware circuitry configured to:

acquire terminal log information indicating an operating state of each piece of hardware constituting the mobile terminal during debug execution;

compute the electric current consumption or the electric current consumption quantity of each piece of the hardware constituting the mobile terminal during the debug execution on the basis of the acquired terminal log information for each piece of the hardware and computation information for computing a unique electric current consumption or a unique electric current consumption quantity from the operating state of the hardware which is pre-stored;

set a threshold value of the electric current consumption or the electric current consumption quantity of each piece of the hardware constituting the mobile terminal; and determine whether the computed electric current consumption or the computed electric current consumption quantity of each piece of the hardware exceeds the threshold value of the hardware and execute a specific process when it is determined that the electric current consumption or the electric current consumption quantity exceeds the threshold value, wherein the hardware circuitry is further configured to output a position of the computer program in which the electric current consumption or the electric current consumption quantity exceeds the threshold value when it is determined that the electric current consumption or the electric current consumption quantity exceeds the threshold value; and output a correction candidate for the computer program based on the computed electric current consumption or the computed electric current consumption quantity at the position of the computer program when the position of the computer program in which the electric current consumption or the electric current consumption quantity exceeds the threshold value is output.

6. The debug device according to claim 5, wherein the hardware circuitry is further configured to:

set an acquisition timing of the terminal log information; and acquire the terminal log information from the mobile terminal on the basis of the acquisition timing.

7. The debug device according to claim 6, wherein the hardware circuitry is further configured to:

set a predetermined range of the computer program; and acquire the terminal log information from the mobile terminal when debugging is executed by the hardware circuitry of the debug device in the predetermined range of the computer program.

* * * * *